US009641230B2

(12) United States Patent
Park et al.

(10) Patent No.: US 9,641,230 B2
(45) Date of Patent: May 2, 2017

(54) BASE STATION AND SIGNAL TRANSMITTING CONTROL METHOD OF THE SAME, AND WIRELESS COMMUNICATION SYSTEM

(71) Applicant: Electronics and Telecommunications Research Institute, Daejeon (KR)

(72) Inventors: Ji Soo Park, Daejeon (KR); Jun Woo Kim, Daejeon (KR); Youn Ok Park, Daejeon (KR); Seung Jae Bahng, Daejeon (KR); Yong Su Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/984,077

(22) Filed: Dec. 30, 2015

(65) Prior Publication Data

US 2016/0192341 A1    Jun. 30, 2016

(30) Foreign Application Priority Data

Dec. 30, 2014   (KR) .................. 10-2014-0193054
Dec. 16, 2015   (KR) .................. 10-2015-0179917

(51) Int. Cl.
*H04W 72/00*   (2009.01)
*H04W 72/08*   (2009.01)
(Continued)

(52) U.S. Cl.
CPC .............................. *H04B 7/0408* (2013.01)

(58) Field of Classification Search
CPC ... H04B 7/0408; H04L 1/0026; H04L 1/1812; H04L 5/0007; H04L 5/0023;
(Continued)

(56) References Cited

U.S. PATENT DOCUMENTS

2011/0143674 A1*   6/2011   Lim .................... H04W 72/082
                                             455/63.1
2012/0157002 A1    6/2012   Choi
(Continued)

FOREIGN PATENT DOCUMENTS

KR   1020120067856 A   6/2012
KR   1020120070385 A   6/2012
KR   1020130095230 A   8/2013

*Primary Examiner* — Bobbak Safaipour
(74) *Attorney, Agent, or Firm* — William Park & Associates Ltd.

(57) ABSTRACT

Disclosed is a base station transmitting multiple beams to multiple beam areas, including: a determination unit determining at least any one of whether a downlink control signal is transmitted through the multiple beams transmitted to the multiple beam areas and a transmission section; a generation unit generating signal transmitting control information including at least any one of whether the downlink control signal is transmitted, the transmission section of the downlink control signal, and derivation information to derive a change of an access beam for a terminal that accesses the multiple beams; a communication unit downlink-transmitting the signal transmitting control information to the multiple beam areas or the multiple beams; and a control unit controlling transmission of the downlink control signal based on the signal transmitting control information.

20 Claims, 10 Drawing Sheets

(51) Int. Cl.
*H04W 72/04* (2009.01)
*H04B 7/0408* (2017.01)

(58) Field of Classification Search
CPC .............. H04L 5/0053; H04W 72/042; H04W 74/0816; H04W 84/12
See application file for complete search history.

(56) References Cited

U.S. PATENT DOCUMENTS

| | | |
|---|---|---|
| 2012/0157153 A1 | 6/2012 | Song |
| 2013/0215844 A1 | 8/2013 | Seol et al. |
| 2013/0343211 A1* | 12/2013 | Liu .................... H04L 25/0204 370/252 |
| 2014/0086126 A1 | 3/2014 | Park et al. |
| 2014/0254517 A1 | 9/2014 | Nam et al. |
| 2014/0315550 A1* | 10/2014 | Ganapathy ............ H04W 8/005 455/434 |
| 2014/0341146 A1* | 11/2014 | Nakashima ......... H04W 72/042 370/329 |
| 2015/0365201 A1* | 12/2015 | Lunttila ................ H04L 5/005 370/329 |
| 2016/0227501 A1* | 8/2016 | Shen ................... H04B 7/0617 |

\* cited by examiner

BASE STATION AND SIGNAL TRANSMITTING CONTROL METHOD OF THE SAME, AND WIRELESS COMMUNICATION SYSTEM

CROSS-REFERENCE TO RELATED APPLICATIONS

This application claims priority to and the benefit of Korean Patent Application No. 10-2014-0193054 filed in the Korean Intellectual Property Office on Dec. 30, 2014 and No. 10-2015-0179917 filed in the Korean Intellectual Property Office on Dec. 16, 2015 the entire contents of which are incorporated herein by reference.

TECHNICAL FIELD

The present invention relates to a base station and a signal transmitting control method of the same, and a wireless communication system.

BACKGROUND ART

As a scheme for satisfying a request for high-speed data transmission, various beamforming technologies are considered. The beamforming technology as a technology that forms a beam pattern in a desired direction by using an array antenna supplies maximum power in the desired direction by controlling power or a phase supplied to an antenna. That is, a beamforming antenna technology as a technology that implements multiple antennas so as to concentratively transfer energy of a transmitted signal in a specific direction can achieve a high signal-to-interference plus noise ratio (SINR) through beamforming.

However, an increase in capacity of a network and additional establishment of various base stations to which the beamforming antenna technology is applied for satisfying the request for the high-speed data transmission increase interference between beamforming signals or between beam signals of neighboring cells and increase power consumption depending on transmission of a radio signal.

In particular, a base station of a general wireless communication system periodically and/or compulsorily transmits a signal recognized by both a transmitting side and a receiving side regardless of the access of the terminal or a status of the accessed terminal and the amount of traffic used. The signal transmitted for periodic and/or compulsory requirements includes a pilot signal called a reference signal and a downlink control signal. However, even when transmission of a specific downlink control signal or reference signal to a section in which information to be transmitted to downlink may not be required is not required due to absence of the accessed terminal or absence of data to be transmitted to a specific wireless section, the downlink control signal is periodically or compulsorily transmitted, and as a result, power consumption of the base station may increase and the resulting interference may occur in another beam signal in the cell or a beam signal of a neighboring cell.

SUMMARY OF THE INVENTION

The present invention has been made in an effort to provide a base station and a signal transmitting control method of the same, and a wireless communication system which transmit multiple beams to multiple beam areas that can reduce inter-beam signal interference for a downlink signal received by a terminal that accesses a neighboring beam area and reduce waste of transmission power of the base station by stopping unnecessary signal transmission required for transmitting a reference signal or a downlink control signal to a specific beam area.

An exemplary embodiment of the present invention provides a base station transmitting multiple beams to multiple beam areas, including: a determination unit determining at least any one of whether a downlink control signal is transmitted through the multiple beams transmitted to the multiple beam areas and a transmission section; a generation unit generating signal transmitting control information including at least any one of whether the downlink control signal is transmitted, the transmission section of the downlink control signal, and derivation information to derive a change of an access beam for a terminal that accesses the multiple beams; a communication unit downlink-transmitting the signal transmitting control information to the multiple beam areas or the multiple beams; and a control unit controlling transmission of the downlink control signal based on the signal transmitting control information.

The multiple beams may be constituted by individual beams, group beams, or the individual beams and the group beams, and the determination unit may determine whether the individual beams, the group beams, or the individual beams and the group beams are transmitted and transmission sections.

The communication unit may transmit the signal transmitting control information through a broadcasting channel or a multi-cast channel.

The signal transmitting control information may include transmission section information of a frame or subframe in which the downlink control signal is transmitted.

The downlink control signal may include at least any one of a downlink control channel signal and a reference signal.

The control unit may stop transmission of the downlink control signal during a partial time interval of the frame or subframe in which the downlink control signal is transmitted.

The control unit may stop transmission of the downlink control signal during a partial frequency interval of the frame or subframe in which the downlink control signal is transmitted.

Another exemplary embodiment of the present invention provides a signal transmitting control method of a base station transmitting multiple beams to multiple beam areas, including: determining at least any one of whether a downlink control signal is transmitted through the multiple beams transmitted to the multiple beam areas and a transmission section; generating signal transmitting control information including at least any one of whether the downlink control signal is transmitted, the transmission section of the downlink control signal, and derivation information to derive a change of an access beam for a terminal that accesses the multiple beams; downlink-transmitting the signal transmitting control information to the multiple beam areas or the multiple beams; and controlling transmission of the downlink control signal based on the signal transmitting control information.

In the downlink-transmitting of the signal transmitting control information to the multiple beam areas or the multiple beams, the signal transmitting control information may be transmitted through a broadcasting channel or a multi-cast channel.

In the determining of at least any one of whether a downlink control signal is transmitted through the multiple beams transmitted to the multiple beam areas and a transmission section, a target transmission area or a target transmission beam may be further determined based on at least any one of whether a terminal accessing the multiple beam areas or multiple beams is present, a status of a terminal that accesses each of the multiple beam areas or multiple beams, traffic of each of the multiple beam areas, and whether the multiple beam areas or the multiple beams interfere with each other.

The signal transmitting control information may include transmission section information of a frame or subframe in which the downlink control signal is transmitted.

The downlink control signal may include at least any one of a downlink control channel signal and a reference signal.

In the controlling of transmission of the downlink control signal based on the signal transmitting control information, transmission of the downlink control signal may stop during a partial time interval of the frame or subframe in which the downlink control signal is transmitted.

In the controlling of transmission of the downlink control signal based on the signal transmitting control information, transmission of the downlink control signal may stop during a partial frequency interval of the frame or subframe in which the downlink control signal is transmitted.

Yet another exemplary embodiment of the present invention provides a wireless communication system including: a base station generating signal transmitting control information including at least any one of whether a downlink control signal is transmitted through the multiple beams transmitted to the multiple beam areas, a transmission section of the downlink control signal, and derivation information to derive a change of an access beam for a terminal that accesses the multiple beams, transmitting the signal transmitting control information to a terminal, and controlling transmission of the downlink control signal based on the signal transmitting control information; and a terminal operating based on the signal transmitting control information.

The base station may stop transmission of the downlink control signal during a partial time interval or a partial frequency interval of the frame or subframe in which the downlink control signal is transmitted.

The terminal may not perform channel measurement or demodulation of a received signal including a resource block in which the downlink control signal is transmitted when the transmission of the downlink control signal stops.

The terminal may change a beam which the terminal accesses in response to the derivation information included in the signal transmitting control information.

The derivation information may include identification information of a terminal to derive the change of the access beam and target beam information to change the access.

The signal transmitting control information may further include an inter-beam signal measurement request, and the terminal may measure a channel of a beam adjacent to a beam which the terminal currently accesses in response to the inter-beam signal measurement request to transfer channel measurement information to the base station.

According to exemplary embodiments of the present invention, a base station and a signal transmitting control method of the same, and a wireless communication system can reduce unnecessary power required for transmitting a downlink control signal and reduce inter-beam signal interference in the same cell and inter-beam signal interference caused by a neighboring cell.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the accompanying drawings. When reference numerals refer to components of each drawing, it is noted that although the same components are illustrated in different drawings, the same components are referred to by the same reference numerals as possible. In describing the exemplary embodiments of the present invention, when it is determined that the detailed description of the known art related to the present invention may obscure understanding the exemplary embodiments of the present invention, the detailed description thereof will be omitted.

Terms such as first, second, A, B, (a), (b), and the like may be used in describing the components of the exemplary embodiments according to the present invention. The terms are only used to distinguish a constituent element from another constituent element, but nature or an order of the constituent element is not limited by the terms. Further, if it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art, and are not interpreted as an ideally or excessively formal meaning unless clearly defined in the present invention.

In the present specification, a terminal (user equipment UE) may be referred to as a user terminal (UT), a mobile terminal (MT), a mobile station (MS), an advanced MS, a subscriber station (SS), a portable subscriber station (PSS), an access terminal (AT), and the like and may include functions of all or a part of the mobile terminal, the advanced mobile station, the subscriber station, the portable subscriber substation, the user equipment, and the like.

In this specification, a base station (BS) may represent an access point (AP), a radio access station (RAS), a node B, a base transceiver station (BTS), a relay station (RS), a mobile multihop relay station (MM BS), a mobile multihop relay station supporting base station (MMR-BS), and the like. Further, the base station may have the entire or partial function of the access point, the radio access station, the node B, the eNB, the base transceiver station, the relay station, the MM RS, the MMR-BS, and the like.

The type of the base station may be referred to as a base station such as a macro cell, a remote radio head (RRH) cell, a pico cell, a micro cell, a femto cell, or the like and may include some or all functions.

Hereinafter, exemplary embodiments of the present invention are described by using a 3GPP long-term evolution (LTE) system, but the present invention is not limited thereto and the exemplary embodiments of the present invention may be applied even to all other communication systems corresponding to the definition.

Figure 1:
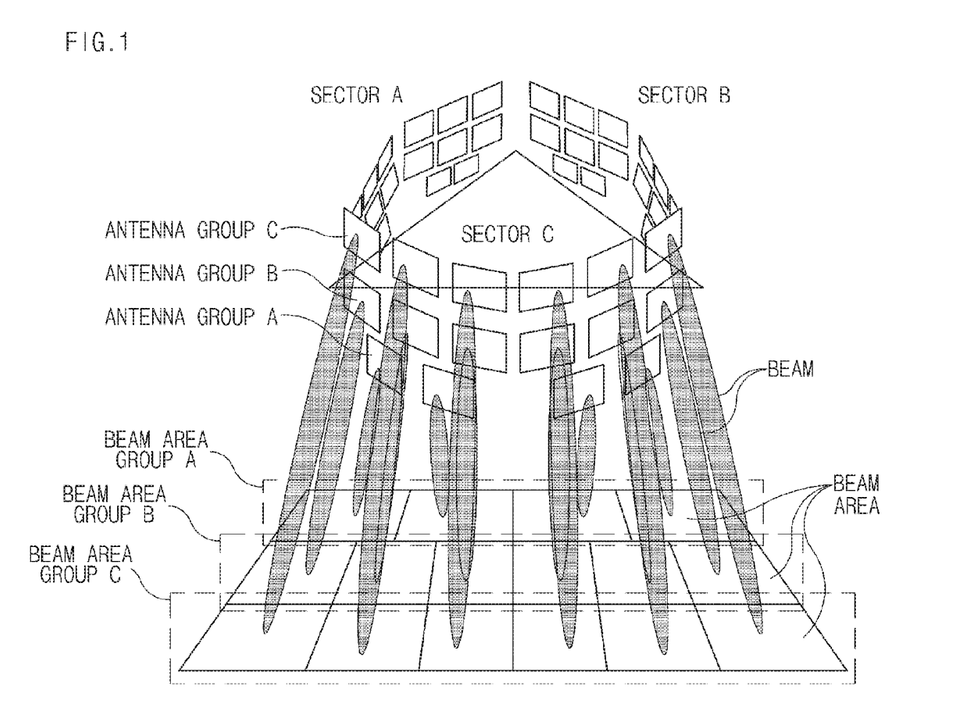
FIG. 1 illustrates multi-beam transmission of a base station according to an exemplary embodiment of the present invention.

FIG. 1 illustrates a multi-beam transmission structure of a base station according to an exemplary embodiment of the present invention.

Referring to FIG. 1, the base station according to the exemplary embodiment of the present invention may transmit multiple beams to multiple beam areas (beam area group A, beam area group B, and beam area group C). For example, it may be appreciated that the base station multiplexes multiple beam signals forming a plurality of beam areas in a sector or a cell by a space division multiple access (SDMA) scheme. The base station may include a multi-antenna structure and include a multi-antenna structure including for example, antenna group A, antenna group B, and antenna group C.

In FIG. 1, it is illustrated that in the base station, 16 beam areas are constituted for each sector based on 3 sectors (sector A, sector B, and sector C), but the present invention is not limited thereto. Beam area group A may include 4 beam areas and each of beam area groups B and C may include 6 beam areas. Further, for example, beam area group A is positioned at a distance close to the base station, beam area group B is positioned at a distance farther from the base station, and beam area group C is positioned at a cell edge farthest from the base station.

It may be appreciated that a beam transmitted from each antenna of the base station is divided and mapped to each beam area. For example, a beam transmitted from antenna group A may be mapped to beam area group A constituted by multiple beam areas and beams transmitted from antenna groups B and C, respectively, may be mapped to beam area groups B and C, respectively.

Figure 2:
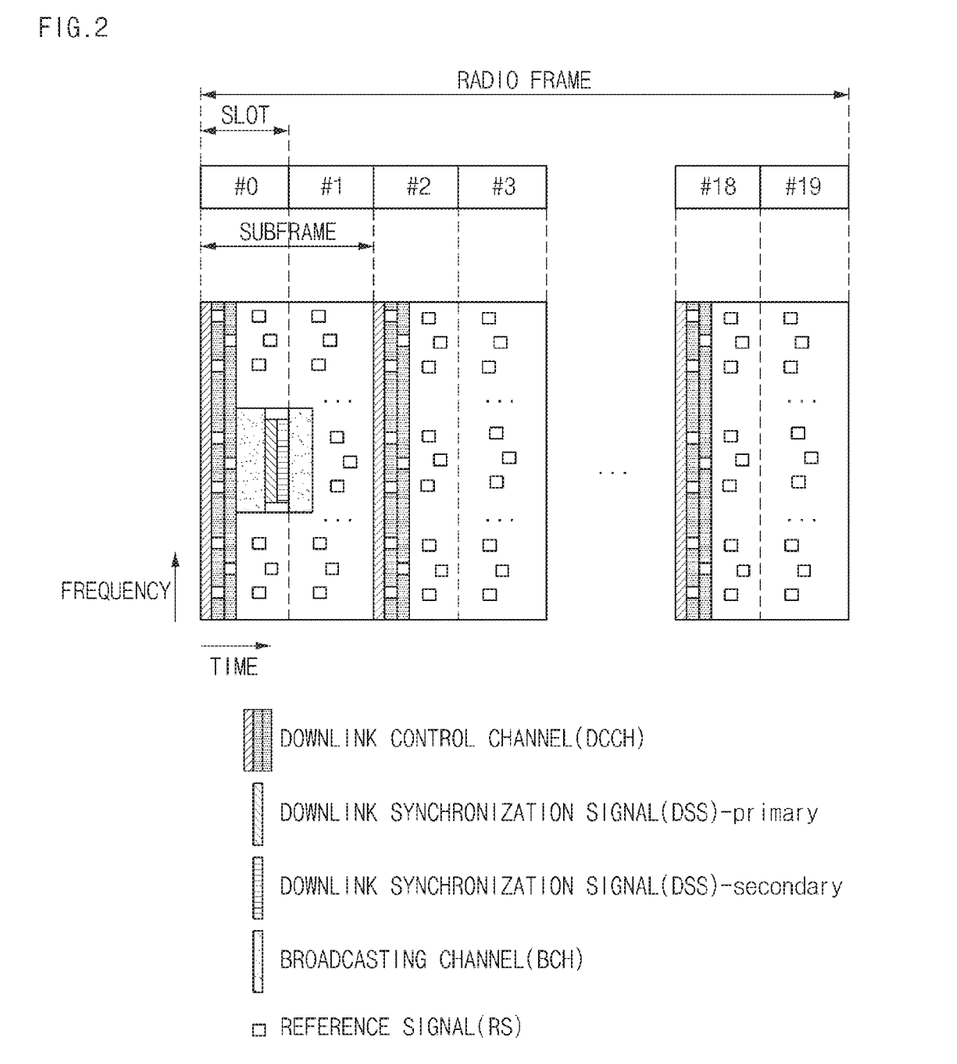
FIG. 2 illustrates a structure of a downlink radio frame transmitted through multiple beams of the base station according to the exemplary embodiment of the present invention.

FIG. 2 illustrates a structure of a downlink radio frame transmitted through multiple beams of the base station according to the exemplary embodiment of the present invention.

Referring to FIG. 2, one radio frame (hereinafter, referred to as 'frame') transmitted through the multiple beams of the base station according to the exemplary embodiment of the present invention may include 10 subframes and one subframe may include two slots.

In the case of an LTE-TDD scheme, each frame may be constituted by one or more downlink subframes and one or more uplink subframes and in the case of an LTE-FDD scheme, each frame may be constituted by one or more downlink subframes or uplink subframes. The structures of the frames transmitted through the multiple beams may be the same as each other. The frame and/or subframe may include a resource element RE constituted by at least one OFDM symbol on a time axis and at least one subcarrier on a frequency axis.

The frame transmitted through the multiple beams may include a downlink control signal. The downlink control signal may include, for example, a downlink synchronization signal (DSS), a downlink control channel (DCCH), a broadcasting channel (BCH), and a reference signal (RS).

The downlink synchronization signal (DSS) is control information for synchronization of a downlink frame of a terminal that accesses a specific beam area or a specific beam and may be divided into a primary or secondary signal according to a role thereof. The broadcasting channel (BCH) may include signal transmitting control information (SI, system information) and transmission information of the downlink control signal may be transferred to the terminal through the SI. The downlink control channel (DCCH) may include a format control channel for distinguishing a control channel region or a format, a resource allocation control channel for downlink or uplink resource allocation, an HARQ control channel providing feedback information (Ack or Nack) which is an indicator of HARQ for uplinking HARQ data, and the like.

The reference signal (RS) may include a reference signal (e.g., a common reference signal, Common_RS) commonly provided to all terminals, a reference signal (e.g., a terminal reference signal, UE_RS) provided together for data demodulation at the time of transmitting a data resource block (RB) to a specific terminal or terminal group), and a beam reference signal (e.g., Beam_RS) provided to terminals that access each multiple beam area. The common reference signal (Common_RS) may be used for coherent demodulation and channel quality estimation of the downlink control channel transmitted to a specific cell or a specific beam and the terminal reference signal (UE_RS) may be used for demodulation and channel quality estimation of the data resource block (RB).

Figure 3:
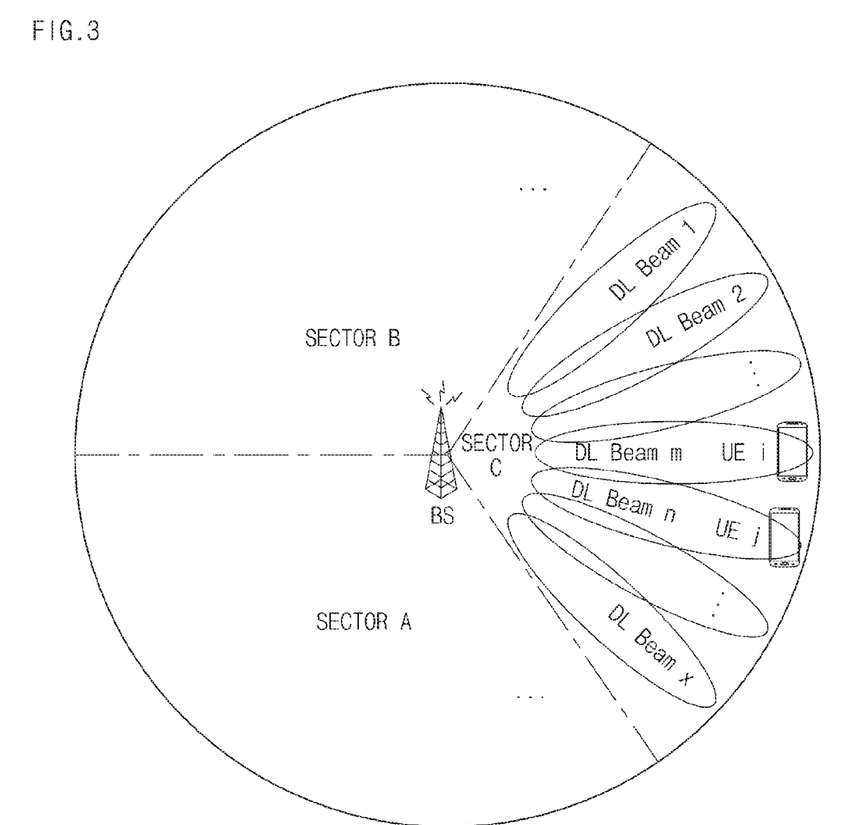
FIG. 3 illustrates transmission of downlink control signals according to the exemplary embodiment of the present invention.
Figure 4:
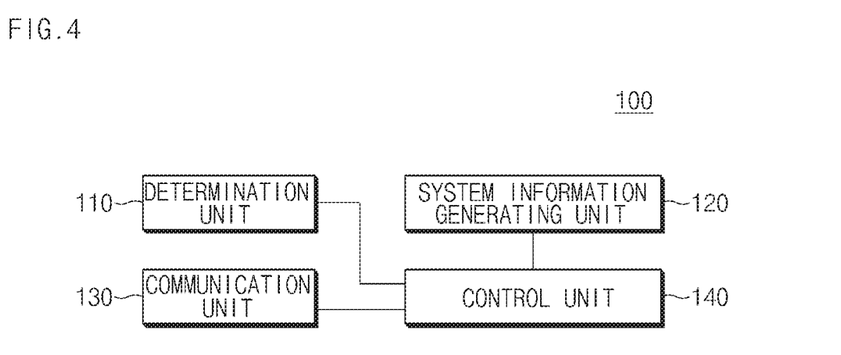
FIG. 4 is a block diagram illustrating the base station according to the exemplary embodiment of the present invention.

FIG. 3 illustrates transmission of downlink control signals of the base station according to the exemplary embodiment of the present invention. FIG. 4 is a block diagram illustrating the base station according to the exemplary embodiment of the present invention.

Referring to FIG. 3, it is exemplarily illustrated that the base station (BS) transmits the multiple beams to the beam area groups in sector C. For example, the base station (BS) may communicate with a terminal (UE) through each beam. Hereinafter, described is a base station 100 according to an exemplary embodiment of the present invention, which determines whether the downlink control signal is transmitted through multiple beams transmitted to multiple beam areas and a transmission section and controls transmission of the downlink control signal by using signal transmitting control information including at least any one of whether the downlink control signal is transmitted, the transmission section, and derivation information to derive a change of an access beam for a terminal that accesses the multiple beams.

Referring to FIG. 4, the base station 100 according to the exemplary embodiment of the present invention may include a determination unit 110, a signal transmitting control information generating unit 120, a communication unit 130, and a control unit 140.

The determination unit 110 may determine at least any one of whether the downlink control signal is transmitted through the multiple beams transmitted to the multiple beam areas and the transmission section of the downlink control signal. For example, the multiple beams may be constituted by individual beams, group beams, or the individual beams and the group beams and the determination unit 110 may determine whether each of the individual beams, the group beams, or the individual beams and the group beams is transmitted and the transmission section of each beam.

The determination unit 110 may further determine a target transmission area or a target transmission beam among the multiple beam areas. Herein, the target transmission area may mean a beam area which the base station 100 determines as a target for controlling transmission of the downlink control signal and the target transmission beam may mean a beam which the base station 100 determines as the target for controlling transmission of the downlink control signal.

The determination unit 110 may determine the target transmission area or the target transmission beam based on at least any one of whether the terminal accessing each of the multiple beam areas or the multiple beams is present, a status of the terminal accessing each of the multiple beam areas or the multiple beams, traffic of each of the multiple beam areas, and whether interference between the multiple beam areas or the multiple beams occurs.

For example, the determination unit 110 may determine a beam area which no terminal accesses as the target transmission area and a beam which no terminal accesses as the target transmission beam. For example, the determination unit 110 may determine a beam area in which the accessing terminal is in an idle state (alternatively, sleep state) as the target transmission area and a beam in which the accessing terminal is in the idle state (alternatively, sleep state) as the target transmission beam. For example, the determination unit 110 may determine a beam area which the traffic is equal to or less than a predetermined reference value as the target transmission area and a beam in which the traffic is equal to or less than the predetermined reference value as the target transmission beam. For example, the determination unit 110 may determine beam areas which interfere with each other as the target transmission area and beams which interfere with each other as the target transmission beam.

The signal transmitting control information generating unit 120 may generate the signal transmitting control information including at least any one of whether the downlink control signal is transmitted, the transmission section of the downlink control signal, and the derivation information to derive the change of the access beam for the terminal that accesses the multiple beams. The signal transmitting control information may include transmission section information of a frame or subframe in which the downlink control signal is transmitted. Further, the signal transmitting control information may include transmission section information of a frame or subframe in which transmission of at least some of the downlink control signals stops. For example, the transmission section information of the frame or subframe may include an index of the frame or subframe.

The downlink control signal may include at least any one of downlink control channel (DCCH) information and reference signal (RS) information.

The signal transmitting control information may include identification information of the target transmission area or the target transmission beam determined by the determination unit 110. Therefore, the terminal that accesses each beam area or beam group area may recognize that the signal transmitting control information will be received based on the identification information.

The signal transmitting control information may further include an inter-beam signal measurement request. The terminal (UE) may perform channel measurement of a beam adjacent to a beam which the terminal (UE) currently accesses in response to the inter-beam signal measurement request and transfer channel measurement information to the base station 100.

The communication unit 130 may downlink-transmit the signal transmitting control information to the multiple beam areas or the multiple beams. To this end, the communication unit 130 may include multiple antennas. The communication unit 130 may transmit the signal transmitting control information through a broadcasting channel (BCH) or a multicast channel. The communication unit 130 may periodically or aperiodically downlink-transmit the signal transmitting control information. The communication unit 130 may downlink-transmit the signal transmitting control information by using a broadcast scheme or a unicast scheme. The terminal (UE) that receives the signal transmitting control information from the communication unit 130 through the downlink may operate based on the signal transmitting control information.

The control unit 140 may control transmission of the downlink control signal based on the signal transmitting control information. For example, the control unit 140 may stop transmission of at least any one of the downlink control channel (DCCH) information and the reference signal (RS) information among the downlink control signals (e.g., the downlink synchronization signal (DSS), the downlink control channel (DCCH), the broadcasting channel (BCH), and the reference signal (RS)) described with reference to FIG. 2. When transmission of at least any one of the downlink control signals stops, the terminal (UE) may not perform the channel measurement or demodulation of a received signal including a resource block in which the downlink control signal is transmitted. Therefore, an unnecessary operation may be decreased in terms of the terminal (UE).

The control unit 140 may stop transmission of the downlink control signal during a partial time interval of the frame or subframe in which the downlink control signal is transmitted. The control unit 140 may stop transmission of the downlink control signal during a partial frequency interval of the frame or subframe in which the downlink control signal is transmitted. This will be described in more detail with reference to FIGS. 5 and 6.

The control unit 140 may control transmission of the downlink control signal based on the derivation information to derive the change of the access beam for the terminal that accesses the multiple beams. The derivation information may include identification information of a terminal that will derive the change of the access beam and target beam information to change the access. The terminal (UE) may change the beam which the terminal (UE) accesses in response to the derivation information included in signal control information. For example, the derivation information may be information, when most terminals access a specific beam (e.g., a first beam), to derive a terminal that accesses another beam (e.g., a second beam) to change the access beam to the specific beam. In this case, the control unit 140 may control transmission of the downlink control signal through another beam (e.g., the second beam) based on the derivation information.

As described above, the base station 100 according to the exemplary embodiment of the present invention controls transmission of the downlink control signal based on the signal transmitting control information including at least any one of whether the downlink control signal is transmitted through the multiple beams transmitted to the multiple beam areas, the transmission section of the downlink control signal, and the derivation information to derive the change of the access beam for the terminal that accesses the multiple beams to reduce unnecessary power required for transmitting the downlink control signal and reduce influences of inter-beam signal interference in the same cell, inter-beam signal interference caused from a neighboring cell, and inter-beam signal interference transmitted by a pico cell, a femto cell, a micro cell, a relay cell, a remote radio & PHY head (RRPH), and the like of a duplicated form.

That is, even when there is no traffic to be transmitted to the terminal for a predetermined time regardless of whether the terminal accessing the base station is present in a general wireless communication system or regardless of the access state such as the idle state, the sleep state, or the like of the terminal, the common reference signal (Common_RS) constituted by the downlink control channel (DCCH) information and a pilot is transmitted to the terminal for each frame/subframe and the downlink synchronization signal (DSS) such as a preamble, or the like is transmitted to the terminal for each frame/subframe and when there is no traffic to be transmitted to the terminal, the base station 100 according to the exemplary embodiment of the present invention stops transmission of at least some of the downlink control signals to reduce power consumption and reduce inter-beam interference.

Figure 5:
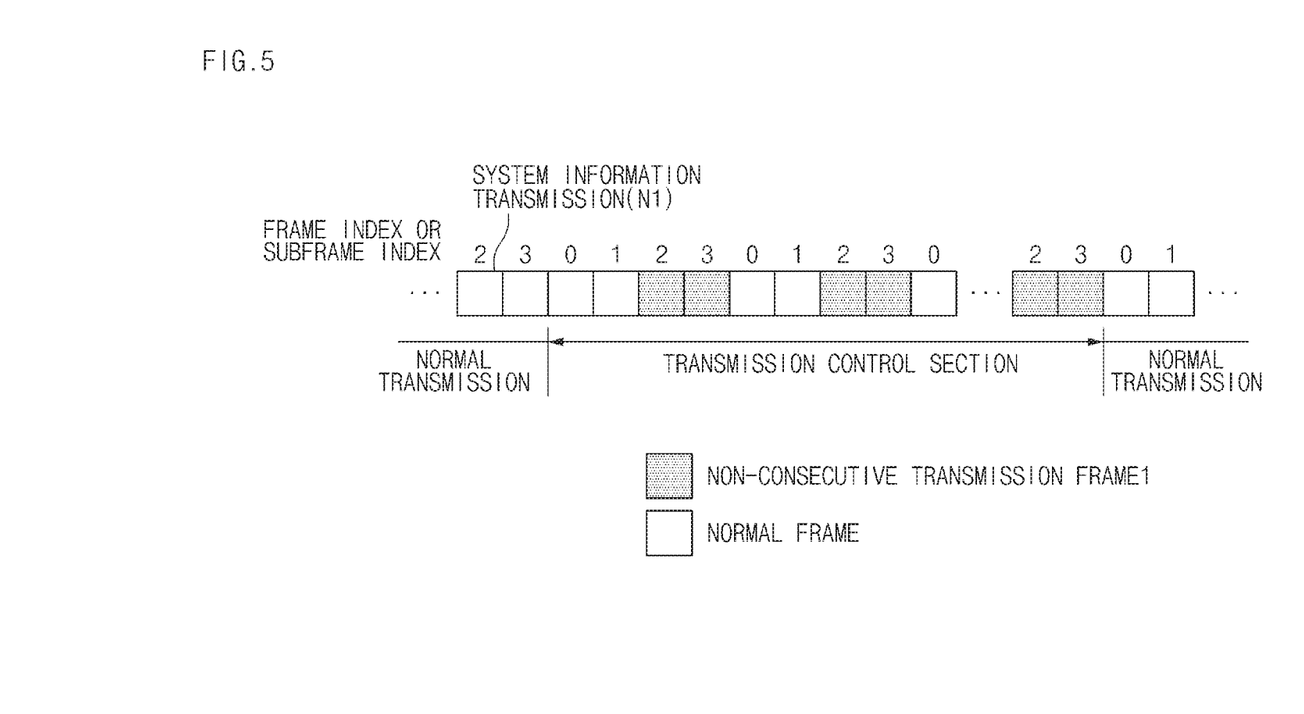
FIGS. 5 and 6 illustrate a transmitting control operation of the downlink control signal to the multiple beams of the base station according to the exemplary embodiment of the present invention.
Figure 6:
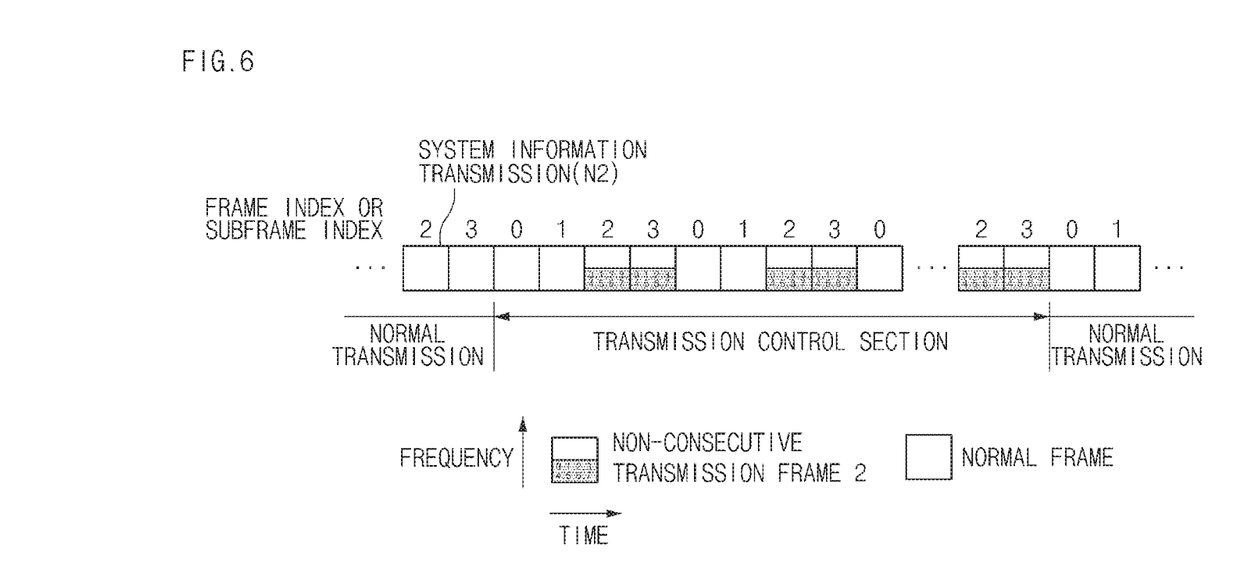

FIGS. 5 and 6 illustrate a transmitting control operation of the downlink control signal to the multiple transmission beams of the base station according to the exemplary embodiment of the present invention.

First, referring to FIG. 5, it is illustrated that transmission of the downlink control signal is controlled in a time domain.

Signal transmitting control information N1 may include transmission section information of the frame or subframe in which the downlink control signal is transmitted. The signal transmitting control information N1 may include transmission section information of a frame or subframe in which transmission of at least some of the downlink control signals stops. For example, the transmission section information of the frame or subframe may include indexes 2 and 3 of the frame and the subframe. When the frame index or subframe index information is included in the signal transmitting control information, the frame index or subframe index information may be expressed as the number of frame and subframe units or the location of the corresponding frame or subframe and when multiple subframes are configured by one frame unit, subframe indication information may represent a start location of the subframe or the number of subframes in which transmission actually stops in one frame within a transmission control section.

Therefore, the control unit 140 may stop transmission of at least some of the downlink control signals of an entire or partial time interval of the frame or subframe corresponding to indexes 2 and 3 based on the signal transmitting control information N1. In FIG. 5, non-consecutive transmission frame 1 may mean a section in which the downlink control signal is not transmitted according to the signal transmitting control information N1 and a normal frame may mean a section in which the downlink control signal and data traffic are normally transmitted.

That is, powers of modulating devices and an RF transmitting device including a physical layer PHY are interrupted in a predetermined time interval in which no signal is transmitted except for the downlink synchronization signal (DSS) and the broadcasting channel (BCH) by stopping transmission of at least some of downlink control signals of a specific beam to reduce the inter-beam interference in the same cell and reduce inter-beam interference from neighboring or duplicated cells and reduce power consumption of a transmitting device of the corresponding beam, thereby improving energy efficiency of the wireless communication system.

Referring to FIG. 6, it is illustrated that transmission of the downlink control signal is controlled in the time domain and a frequency domain is illustrated.

Signal transmitting control information N2 may include transmission section information of the frame or subframe in which the downlink control signal is transmitted. The signal transmitting control information N2 may include transmission section information of a frame or subframe in which transmission of at least some of the downlink control signals stops.

Therefore, the control unit 140 may stop transmission of at least some of the downlink control signals of an entire or a partial frequency interval of the frame or subframe corresponding to indexes 2 and 3 based on the signal transmitting control information N2. That is, the indexes of the frame or subframe in which transmission of at least some of the downlink control signals stops are #2 and 3 and represent a case in which transmission at least some of the downlink control signals in a specific radio resource block (e.g., radio resource blocks #0, 1, 2, 3, 4, 5, 6, and 7 and non-consecutive transmission frame 2) to the frequency domain stops in the corresponding frame or subframe. The frame or subframe having indexes # and 1 represents a wireless section (that is, normal frame) in which the data traffic and the downlink control signal may be normally transmitted.

Figure 7:
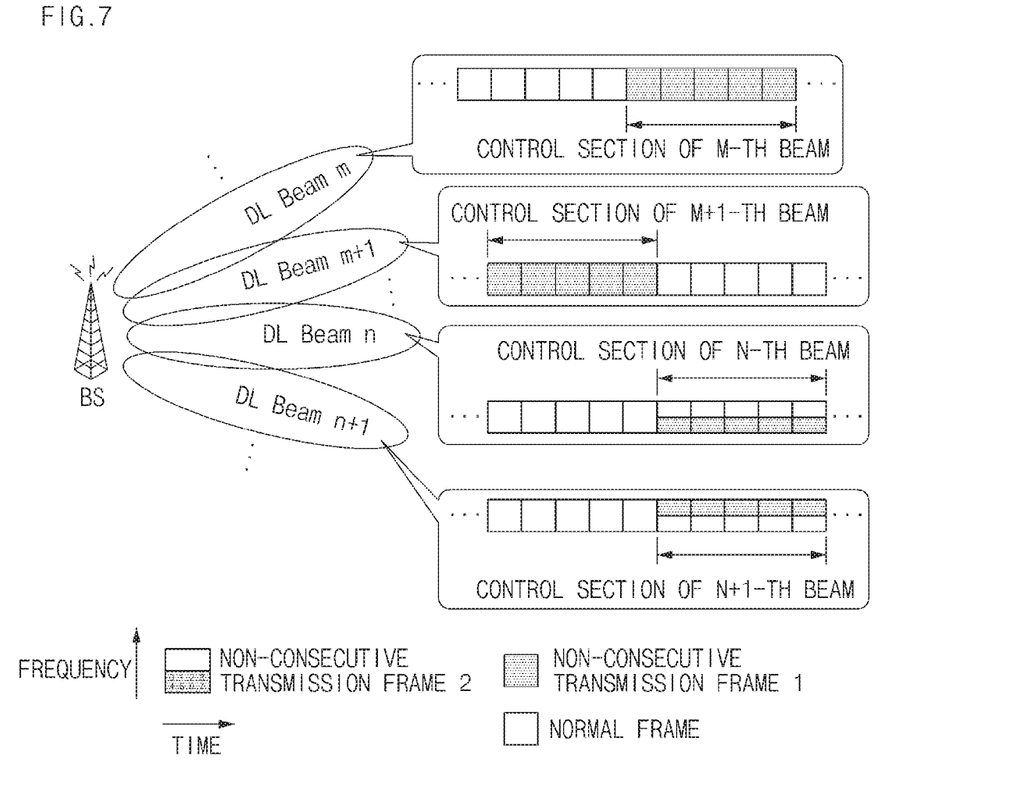
FIG. 7 illustrates the transmitting control operation of the downlink control signal to the multiple beams of the base station according to the exemplary embodiment of the present invention.

FIG. 7 illustrates the transmitting control operation of the downlink control signal to the multiple transmission beams of the base station according to the exemplary embodiment of the present invention.

Referring to FIG. 7, the base station 100 according to the exemplary embodiment of the present invention may control transmission of the downlink control signal of an adjacent transmission beam.

In detail, the base station 100 may downlink-transmit signal transmitting control information to set the transmission section so as to prevent the transmission sections of the downlink control signals from being duplicated with each other to terminals that access adjacent transmission beams. For example, the base station 100 may generate signal transmitting control information to set transmission control sections so as to prevent a transmission control section of a downlink control signal of an m-th transmission beam and a transmission control section of a downlink control signal of an m+1-th transmission beam from being duplicated with each other.

The base station 100 may reduce inter-beam signal interference by differently setting the transmission control section of the downlink control signal in the frequency domain even though the transmission control sections of the time domain are the same as each other for each beam in order to reduce interference between an n-th transmission beam and an adjacent n+1-th transmission beam.

Figure 8:
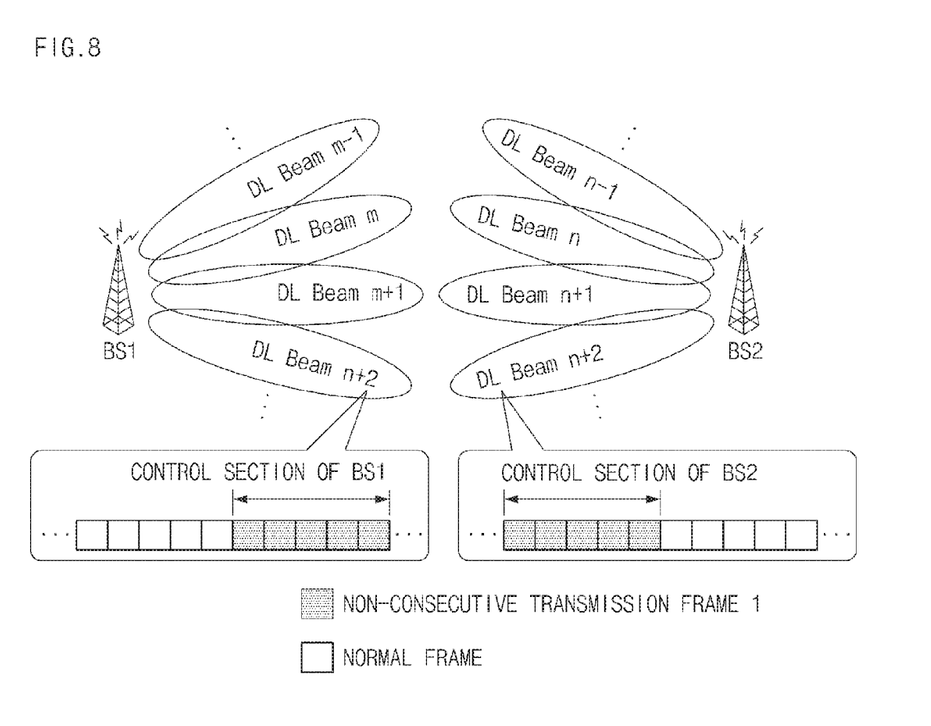
FIG. 8 illustrates the transmitting control operation of the downlink control signal at a cell edge area of the base station according to the exemplary embodiment of the present invention.

FIG. 8 illustrates the transmitting control operation of the downlink control signal at a cell edge area of the base station according to the exemplary embodiment of the present invention.

Referring to FIG. 8, each base station BS1 or BS2 may include a control function to transfer signal transmitting control information to all terminals or a specific terminal positioned at a cell edge beam area of each base station through a beam positioned a beam area of the cell edge (e.g., beam area group A in FIG. 1).

An access network control device (not illustrated) for scheduling a transmission control section of a downlink control signal through cooperation at a cell edge beam area among base stations may be provided. Herein, the access network control device may be mounted on the base station, mounted on a network device such as a gateway, or the like, or independently configured.

The access network control device may collect the number of terminals which access each base station, the access state of the terminal, a traffic load amount, and the like in a beam area of a cell edge of each base station through cooperation of multiple base stations. Further, the access control device may collect the type of the base station regarding whether the corresponding base stations are base stations neighbor to each other among the base stations, whether the corresponding base stations are duplicated base stations such as pico cell, relay station cell, and femto cell base stations, and the like, the positional information of each base station, and the like. The access network control device may determine whether each base station may perform the transmission control operation of the downlink control signal in the beam area of the cell edge through the collected information.

The access network control device determines the downlink control signal transmission control section, and the like in order to reduce signal interference between base stations which may perform the transmission control operation of the downlink control signal and a base station which may not perform the transmission control operation and reduce unnecessary transmission power of the radio signal and transmits scheduling information for the downlink control signal transmission control to the corresponding base stations. The base station which receives the scheduling information from the access network control device transmits signal transmission control information to at least one terminal positioned in the beam area of the cell edge, interrupts power of a radio signal transmitting apparatus such as a transmitting apparatus including a transmission circuit element, an RF apparatus, or the like in a transmission stop interval of the downlink control signal and during a predetermined time or in a predetermined frequency interval where transmission actually stops, and stops the downlink radio signal to reduce a power load of a wireless transmitting apparatus and reduce signal interference between the base stations.

Figure 9:
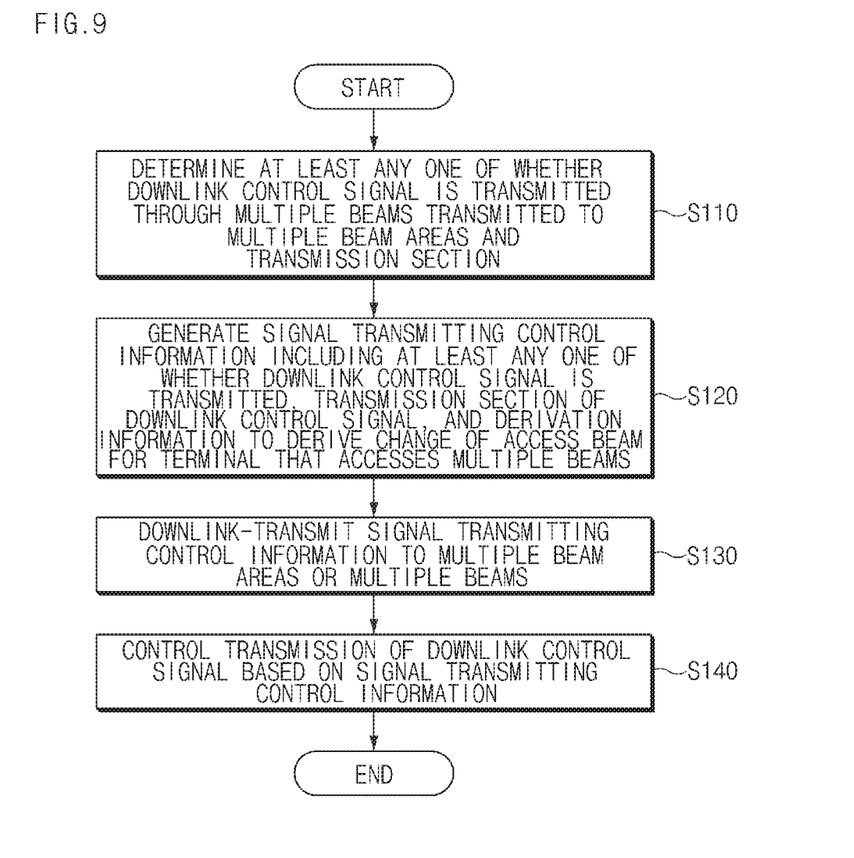
FIG. 9 is a flowchart illustrating a signal transmitting control method of a base station according to another exemplary embodiment of the present invention.

FIG. 9 is a flowchart illustrating a signal transmitting method of a base station according to another exemplary embodiment of the present invention.

Referring to FIG. 9, the signal transmitting method of the base station according to the exemplary embodiment of the present invention may include determining at least any one of whether a downlink control signal is transmitted through the multiple beams transmitted to the multiple beam areas and a transmission section (S110); generating signal transmitting control information including at least any one of whether the downlink control signal is transmitted, the transmission section of the downlink control signal, and derivation information to derive a change of an access beam for a terminal that accesses the multiple beams (S120); downlink-transmitting the signal transmitting control information to the multiple beam areas or the multiple beams (S130); and controlling transmission of the downlink control signal based on the signal transmitting control information (S140).

Hereinafter, steps S110 to S140 described above will be described in more detail with reference to FIG. 4.

The determination unit 110 may determine at least any one of whether the downlink control signal is transmitted through the multiple beams transmitted to the multiple beam areas and the transmission section (S11). For example, the multiple beams may be constituted by individual beams, group beams, or the individual beams and the group beams and the determination unit 110 may determine whether each of the individual beams, the group beams, or the individual beams and the group beams is transmitted and the transmission section of each beam. The determination unit 110 may further determine a target transmission area or a target transmission beam among the multiple beam areas. Herein, the target transmission area may mean a beam area may mean a beam area determined as a target for controlling transmission of the downlink control signal and the target transmission beam may mean a beam determined as the target for controlling transmission of the downlink control signal.

The determination unit 110 may determine the target transmission area or the target transmission beam based on at least one of whether the terminal accessing each of the multiple beam areas or the multiple beams is present, a status of the terminal accessing each of the multiple beam areas or the multiple beams, traffic of each of the multiple beam areas, and whether interference between the multiple beam areas or the multiple beams occurs.

The signal transmitting control information generating unit 120 may generate the signal transmitting control information including at least any one of whether the downlink control signal is transmitted, the transmission section of the downlink control signal, and the derivation information to derive the change of the access beam for the terminal that accesses the multiple beams. The signal transmitting control information may include transmission section information of the frame or subframe in which the downlink control signal is transmitted. Further, the signal transmitting control information may include transmission section information of a frame or subframe in which transmission of at least some of the downlink control signals stops. For example, the transmission section information of the frame or subframe may include an index of the frame or subframe.

The communication unit 130 may downlink-transmit the signal transmitting control information to the multiple beam areas or the multiple beams (S130). The communication unit 130 may downlink-transmit the signal transmitting control information by using a broadcast scheme or a unicast scheme.

The control unit 140 may control transmission of the downlink control signal based on the signal transmitting control information (S140). For example, the control unit 140 may stop transmission of at least any one of the downlink control channel (DCCH) information and the reference signal (RS) information among the downlink control signals (e.g., the downlink synchronization signal (DSS), the downlink control channel (DCCH), the broadcasting channel (BCH), and the reference signal (RS)) described with reference to FIG. 2.

The control unit 140 may stop transmission of the downlink control signal during a partial time interval of the frame or subframe in which the downlink control signal is transmitted. The control unit 140 may stop transmission of the downlink control signal during a partial frequency interval of the frame or subframe in which the downlink control signal is transmitted.

The control unit 140 may control transmission of the downlink control signal based on the derivation information to derive the change of the access beam for the terminal that accesses the multiple beams. For example, the derivation information may information, when most terminals access a specific beam (e.g., a first beam), to derive a terminal that accesses another beam (e.g., a second beam) to change the access beam to the specific beam. In this case, the control unit 140 may control transmission of the downlink control signal through another beam (e.g., the second beam) based on the derivation information.

Figure 10:
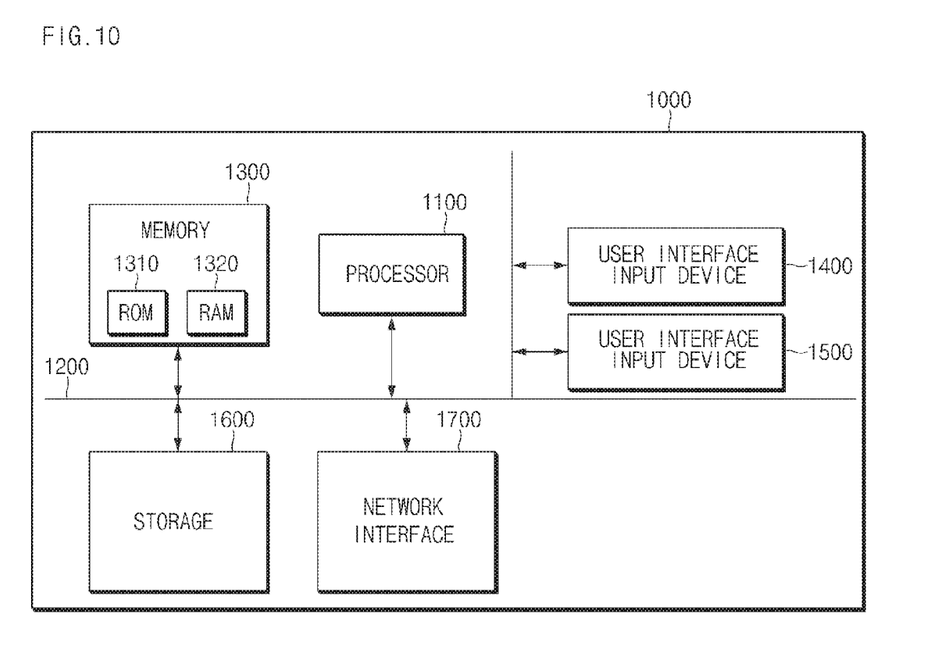
FIG. 10 is a block diagram illustrating a computing system that executes a signal transmitting control method of a base station according to yet another exemplary embodiment of the present invention.

FIG. 10 is a block diagram illustrating a computing system that executes a signal transmitting method of a base station according to yet another exemplary embodiment of the present invention.

Referring to FIG. 10, a computing system 1000 may include at least one processor 1100, a memory 1300, a user interface input device 1400, a user interface output device 1500, a storage 1600, and a network interface 1700 connected through a bus 1200.

The processor 1100 may be a central processing unit (CPU) or a semiconductor device that executes processing of commands stored in the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a user terminal. As yet another method, the processor and the storage medium may reside in the user terminal as individual components.

The above description is illustrative purpose only and various modifications and transformations become apparent to those skilled in the art within a scope of an essential characteristic of the present invention.

Therefore, the exemplary embodiments disclosed in the present invention are used to not limit but describe the technical spirit and the scope of the technical spirit of the present invention is not limited by the exemplary embodiments. Therefore, the spirit of the present invention should not be limited to the above-described exemplary embodiments, and the following claims as well as all modified equally or equivalently to the claims are intended to fall within the scope and spirit of the invention.

What is claimed is:

1. An operation method performed in a first base station supporting transmission based on multiple beams, the operation method comprising:
    configuring, for respective multiple beams, a non-consecutive signal transmission interval in which a control signal is not transmitted;
    transmitting information indicating the non-consecutive signal transmission interval; and
    in the non-consecutive signal transmission interval, stopping transmission of the control signal through a beam#n to which the non-consecutive signal transmission interval is applied among the multiple beams, and transmitting the control signal through a beam#m to which the non-consecutive signal transmission interval is not applied among the multiple beams, wherein each of the n and the m is a positive integer.

2. The operation method of claim 1, wherein the information indicating the non-consecutive signal transmission interval is at least one of an index and a number of respective frame, subframe, slot, and symbol.

3. The operation method of claim 1, wherein the information indicating the non-consecutive signal transmission interval is information of frequency band in which the control signal is not transmitted.

4. The operation method of claim 1, wherein the information indicating the non-consecutive signal transmission interval is transmitted through the multiple beams or the beam#n to which the non-consecutive signal transmission interval is applied.

5. The operation method of claim 1, wherein the control signal includes at least one of a downlink control channel, a broadcasting channel, a reference signal, or a synchronization signal.

6. The operation method of claim 1, further comprising transmitting information indicating the beam#n to which the non-consecutive signal transmission interval is applied.

7. The operation method of claim 1, wherein the non-consecutive signal transmission interval for the beam#n is configured to be not overlapped with a non-consecutive signal transmission interval for a neighboring beam#(n+1) to the beam#n among the multiple beams.

8. The operation method of claim 1, wherein a size of the non-consecutive signal transmission interval for respective multiple beams is configured identically.

9. The operation method of claim 1, wherein, when the beam#n of the first base station is overlapped with a beam#l of a second base station, the non-consecutive signal transmission interval for the beam#n is configured to be not overlapped with a non-consecutive signal transmission interval for the beam#l, wherein the l is a positive integer.

10. An operation method performed in a terminal in a communication network, the operation method comprising:
    receiving, from a base station supporting transmission based on multiple beams, information indicating a non-consecutive signal transmission interval in which a control signal is not transmitted; and
    when the non-consecutive signal transmission interval is configured for a beam#n supporting an area to which the terminal belongs among the multiple beams, stopping a receiving operation of the control signal in the non-consecutive signal transmission interval, and performing the receiving operation of the control signal in an interval except for the non-consecutive signal transmission interval, wherein the n is a positive integer.

11. The operation method of claim 10, wherein the information indicating the non-consecutive signal transmission interval is at least one of an index and a number of respective frame, subframe, slot, and symbol.

12. The operation method of claim 10, wherein the information indicating the non-consecutive signal transmission interval is information of frequency band in which the control signal is not transmitted.

13. The operation method of claim 10, wherein the control signal includes at least one of a downlink control channel, a broadcasting channel, a reference signal, or a synchronization signal.

14. The operation method of claim 10, further comprising receiving information indicating the beam#n to which the non-consecutive signal transmission interval is applied.

15. A first base station supporting transmission based on multiple beams, comprising:
   a processor; and
   a memory storing at least one command executed by the processor,
   wherein the at least one command is executed to configure, for respective multiple beams, a non-consecutive signal transmission interval in which a control signal is not transmitted;
   transmit information indicating the non-consecutive signal transmission interval; and
   in the non-consecutive signal transmission interval, stop transmission of the control signal through a beam#n to which the non-consecutive signal transmission interval is applied among the multiple beams, and transmit the control signal through a beam#m to which the non-consecutive signal transmission interval is not applied among the multiple beams, wherein each of the n ant the m is a positive integer.

16. The first base station of claim 15, wherein the information indicating the non-consecutive signal transmission interval is transmitted through the multiple beams or the beam#n to which the non-consecutive signal transmission interval is applied.

17. The first base station of claim 15, wherein the control signal includes at least one of a downlink control channel, a broadcasting channel, a reference signal, or a synchronization signal.

18. The first base station of claim 15, wherein the non-consecutive signal transmission interval for the beam#n is configured to be not overlapped with a non-consecutive signal transmission interval for a neighboring beam#(n+1) to the beam#n among the multiple beams.

19. The first base station of claim 15, wherein a size of the non-consecutive signal transmission interval for respective multiple beams is configured identically.

20. The first base station of claim 15, wherein, when the beam#n of the first base station is overlapped with a beam#l of a second base station, the non-consecutive signal transmission interval for the beam#n is configured to be not overlapped with a non-consecutive signal transmission interval for the beam#l, wherein the l is a positive integer.

* * * * *